US008180933B2

(12) United States Patent
Krantz et al.

(10) Patent No.: US 8,180,933 B2
(45) Date of Patent: May 15, 2012

(54) DYNAMIC CALL HANDLING FROM MULTIPLE ATTACHED DEVICES WHEREIN DEVICES ADVERTIZE ITS CAPABILILES BEFORE FACILITATING CALL THROUGH APPROPRIATE DEVICE

(75) Inventors: Anton Krantz, Redmond, WA (US); Lokesh Srinivas Koppolu, Redmond, WA (US); Sunil Kasturi, Seattle, WA (US); Yu An, Sammamish, WA (US); Adrian Potra, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 308 days.

(21) Appl. No.: 12/357,229

(22) Filed: Jan. 21, 2009

(65) Prior Publication Data

US 2010/0185787 A1    Jul. 22, 2010

(51) Int. Cl.
*G06F 3/00* (2006.01)
*H04Q 7/20* (2006.01)
*H04B 1/03* (2006.01)

(52) U.S. Cl. ............ 710/16; 710/8; 710/9; 710/10; 710/14; 710/15; 710/17; 710/18; 19/415; 19/417

(58) Field of Classification Search ........ 710/8–10, 710/14–19; 455/415, 417
See application file for complete search history.

(56) References Cited

U.S. PATENT DOCUMENTS

| | | | | |
|---|---|---|---|---|
| 5,742,668 A * | 4/1998 | Pepe et al. | ........ | 455/415 |
| 6,091,948 A * | 7/2000 | Carr et al. | ........ | 455/414.1 |
| 6,233,448 B1 * | 5/2001 | Alperovich et al. | ........ | 455/417 |
| 6,650,748 B1 | 11/2003 | Edwards et al. | | |
| 6,701,144 B2 * | 3/2004 | Kirbas et al. | ........ | 455/417 |
| 6,947,538 B2 * | 9/2005 | Shen et al. | ........ | 379/215.01 |
| 7,454,197 B2 * | 11/2008 | Roberts et al. | ........ | 455/417 |
| 7,587,482 B2 * | 9/2009 | Henderson et al. | ........ | 709/223 |
| 7,912,193 B2 * | 3/2011 | Chingon et al. | ........ | 379/142.08 |
| 2001/0055974 A1 * | 12/2001 | Bates et al. | ........ | 455/456 |
| 2002/0077080 A1 * | 6/2002 | Greene | ........ | 455/412 |
| 2005/0130680 A1 * | 6/2005 | Northcutt | ........ | 455/457 |
| 2005/0180457 A1 | 8/2005 | Chen et al. | | |
| 2007/0004473 A1 | 1/2007 | Clark et al. | | |
| 2007/0032225 A1 * | 2/2007 | Konicek et al. | ........ | 455/417 |
| 2007/0058637 A1 | 3/2007 | Lo | | |
| 2007/0280452 A1 | 12/2007 | Bernard | | |
| 2008/0062997 A1 | 3/2008 | Nix | | |
| 2008/0137643 A1 | 6/2008 | Khanchandani et al. | | |
| 2009/0097628 A1 * | 4/2009 | Yap et al. | ........ | 379/202.01 |

OTHER PUBLICATIONS

Cisco Personal Assistant 1.4, Cisco Systems, Jun. 24, 2003, Http://www.cisco.com/en/US/products/sw/voicesw/ps2026/prod_presentation_list.html, printed Oct. 1, 2004.*
"Application Interfaces", Retrieved at <<http://www.mitel.com/resources/guide_8922_misn.pdf>>, pp. 1-32.
"Zoiper Free IAX and SIP Softphone 2.15", Retrieved at <<http://zoiper-free-iax-and-sip-softphone.attractel.qarchive.org/>>, Nov. 20, 2008, pp. 5.
"Headwind GSM Modem Driver", Retrieved at <<http://www.sharewareconnection.com/headwind-gsm-modem-driver.htm>>, Nov. 20, 2008, pp. 3.

* cited by examiner

*Primary Examiner* — Tammara Peyton
(74) *Attorney, Agent, or Firm* — Turk IP Law, LLC

(57) ABSTRACT

Multiple peripheral devices are used for various modes of communication in a unified communication application. Employing standard or custom protocols, connected peripheral devices can be configured automatically and different modes of communication such as audio, video, data, and text, are routed to available or selected peripheral devices. Incoming communication requests can be extended to multiple peripheral devices synchronously and users enabled to switch between peripheral devices seamlessly during a communication session.

17 Claims, 8 Drawing Sheets

DYNAMIC CALL HANDLING FROM MULTIPLE ATTACHED DEVICES WHEREIN DEVICES ADVERTIZE ITS CAPABILILES BEFORE FACILITATING CALL THROUGH APPROPRIATE DEVICE

BACKGROUND

While telephone technologies changed little until last decade, telecommunication services evolved substantially in a relatively short time with the importation of computing technologies into telecommunication systems and devices. Newer systems combine a variety of short range and long range communication capabilities over a number of networks including traditional phone networks, wireless networks, and similar ones. Tele-communication end devices as well as support devices and programs for such newer systems are more similar to computer networks than conventional telephone networks. Thus, a large number of capabilities may be added to those already provided by modern telecommunication devices and networks.

An example of recent, enhanced telecommunication systems is Unified Communication (UC) systems, which enable communication in a variety of modes over a number of networks including computer networks. One of the key value propositions of Unified Communications is enabling the use of the computers as a phone for real time communications (i.e. soft phone). Hardware manufacturers provide audio peripherals, which may be used as audio devices for the soft phone. Speakers, microphones, and other peripheral devices may be connected to a computer through a wired or wireless medium and use standard or custom protocols to communicate with application(s) on the computer. Interoperability specifications such as Human Interface Device (HID) protocol enable these devices to work seamlessly with a communication applications. One drawback of current systems is that they typically allow one set of peripheral devices to be utilized at one time restricting exploitation of enhanced capabilities of computers and applications in a UC system.

SUMMARY

This summary is provided to introduce a selection of concepts in a simplified form that are further described below in the Detailed Description. This summary is not intended to exclusively identify key features or essential features of the claimed subject matter, nor is it intended as an aid in determining the scope of the claimed subject matter.

Embodiments are directed to enabling utilization of multiple peripheral devices for various modes of communication in a unified communication application. Attached peripheral devices may be configured automatically and different modes of communication (e.g. audio, text, video) may be routed to available or selected peripheral devices. Incoming communication requests may be extended to multiple peripheral devices synchronously and users enabled to switch between peripheral devices seamlessly.

These and other features and advantages will be apparent from a reading of the following detailed description and a review of the associated drawings. It is to be understood that both the foregoing general description and the following detailed description are explanatory and do not restrict aspects as claimed.

DETAILED DESCRIPTION

Figure 1:
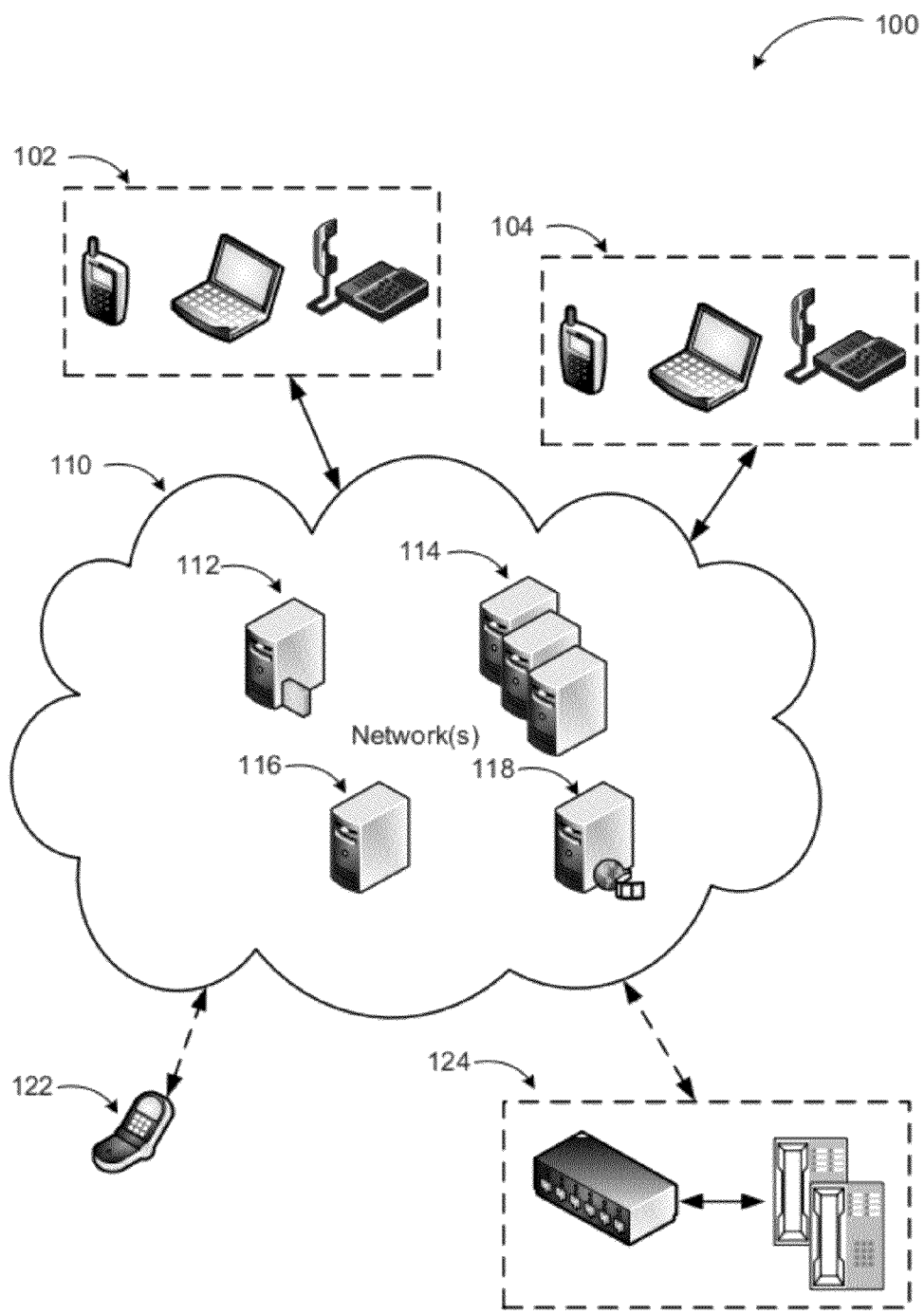
FIG. 1 is a diagram illustrating an example unified communications system.

As briefly described above, multiple peripheral devices may be automatically configured and dynamically utilized by a communication application in a UC system according to embodiments. In the following detailed description, references are made to the accompanying drawings that form a part hereof, and in which are shown by way of illustrations specific embodiments or examples. These aspects may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

While the embodiments will be described in the general context of program modules that execute in conjunction with an application program that runs on an operating system on a personal computer, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multiprocessor systems, microprocessor-based or programmable consumer electronics, minicomputers, mainframe computers, and comparable computing devices. Embodiments may also be practiced in distributed computing environments where tasks are performed by remote processing devices that are linked through a communications network. In a distributed computing environment, program modules may be located in both local and remote memory storage devices.

Embodiments may be implemented as a computer-implemented process (method), a computing system, or as an article of manufacture, such as a computer program product or computer readable media. The computer program product may be a computer storage medium readable by a computer system and encoding a computer program that comprises instructions for causing a computer or computing system to perform example process(es). The computer-readable storage medium can for example be implemented via one or more of a volatile computer memory, a non-volatile memory, a hard drive, a flash drive, a floppy disk, or a compact disk, and comparable media. The computer program product may also be a propagated signal on a carrier (e.g. a frequency or phase modulated signal) or medium readable by a computing system and encoding a computer program of instructions for executing a computer process.

Throughout this specification, the term "platform" may be a combination of software and hardware components for dynamic call handling through multiple attached devices. Examples of platforms include, but are not limited to, a hosted service executed over a plurality of servers, an application executed on a single server, and comparable systems. The term "server" refers to a computing device executing one or more software programs typically in a networked environment. More detail on these technologies and example operations is provided below.

Referring to FIG. 1, diagram 100 of an example unified communications system is illustrated. A unified communication system is an example of modern communication systems with a wide range of capabilities and services that can be provided to subscribers. A unified communication system is a real-time communications system facilitating instant messaging, presence, audio-video conferencing, and web conferencing functionality.

In a UC system such as the one shown in diagram 100, users may communicate via a variety of end devices (102, 104), which are client devices of the UC system. Each client device may be capable of executing one or more communication applications for voice communication, video communication, instant messaging, application sharing, data sharing, and the like. In addition to their advanced functionality, the end devices may also facilitate traditional phone calls through an external connection such as through PBX 124 to a Public Switched Telephone Network ("PSTN"). End devices may include any type of smart phone, cellular phone, any computing device executing a communication application, a smart automobile console, and advanced phone devices with additional functionality.

UC Network(s) 110 includes a number of servers performing different tasks. For example, UC servers 114 provide registration, presence, and routing functionalities. Presence functionality enables the system to route calls to a user to anyone of the client devices assigned to the user based on default and/or user set policies. For example, if the user is not available through a regular phone, the call may be forwarded to the user's cellular phone, and if that is not answering a number of voicemail options may be utilized. Since the end devices can handle additional communication modes, UC servers 114 may provide access to these additional communication modes (e.g. instant messaging, video communication, etc.) through access server 112. Access server 112 resides in a perimeter network and enables connectivity through UC network(s) 110 with other users in one of the additional communication modes. UC servers 114 may include servers that perform combinations of the above described functionalities or specialized servers that only provide a particular functionality. For example, home servers providing presence functionality, routing servers providing routing functionality, and so on. Similarly, access server 112 may provide multiple functionalities such as firewall protection and connectivity, or only specific functionalities.

Audio/Video (A/V) conferencing server 118 provides audio and/or video conferencing capabilities by facilitating those over an internal or external network. Mediation server 116 mediates signaling and media to and from other types of networks such as a PSTN or a cellular network (e.g. calls through PBX 124 or from cellular phone 122). Mediation server 116 may also act as a Session Initiation Protocol (SIP) user agent (e.g. Back-to-Back User Agent "B2BUA").

In a UC system, users may have one or more identities, which is not necessarily limited to a phone number. The identity may take any form depending on the integrated networks, such as a telephone number, a Session Initiation Protocol (SIP) Uniform Resource Identifier (URI), or any other identifier. While any protocol may be used in a UC system, SIP is a preferred method.

The SIP is an application-layer control (signaling) protocol for creating, modifying, and terminating sessions with one or more participants. It can be used to create two-party, multi-party, or multicast sessions that include Internet telephone calls, multimedia distribution, and multimedia conferences. SIP is designed to be independent of the underlying transport layer.

SIP clients may use Transport Control Protocol ("TCP") to connect to SIP servers and other SIP endpoints. SIP is primarily used in setting up and tearing down voice or video calls. However, it can be used in any application where session initiation is a requirement. These include event subscription and notification, terminal mobility, and so on. Voice and/or video communications are typically done over separate session protocols, typically Real Time Protocol ("RTP").

As mentioned previously, a wide range of communication modes may be facilitated by a UC system including, but not limited to, audio, video, textual, data sharing, application sharing, and any combination thereof. While specific communication devices such as phones may be limited to a smaller number of possible communication modes, communication applications executed on computing devices may provide the ability to accommodate a plurality of modalities through peripheral devices coupled to the computing device. Examples of various peripheral device combinations and facilitated communication modes are discussed in further detail below.

While the example system in FIG. 1 has been described with specific components such as mediation server, A/V server, and similar devices, embodiments are not limited to these components or system configurations and can be implemented with other system configuration employing fewer or additional components. Functionality of systems enabling dynamic call handling through multiple peripheral devices may also be distributed among the components of the systems differently depending on component capabilities and system configurations.

Figure 2:
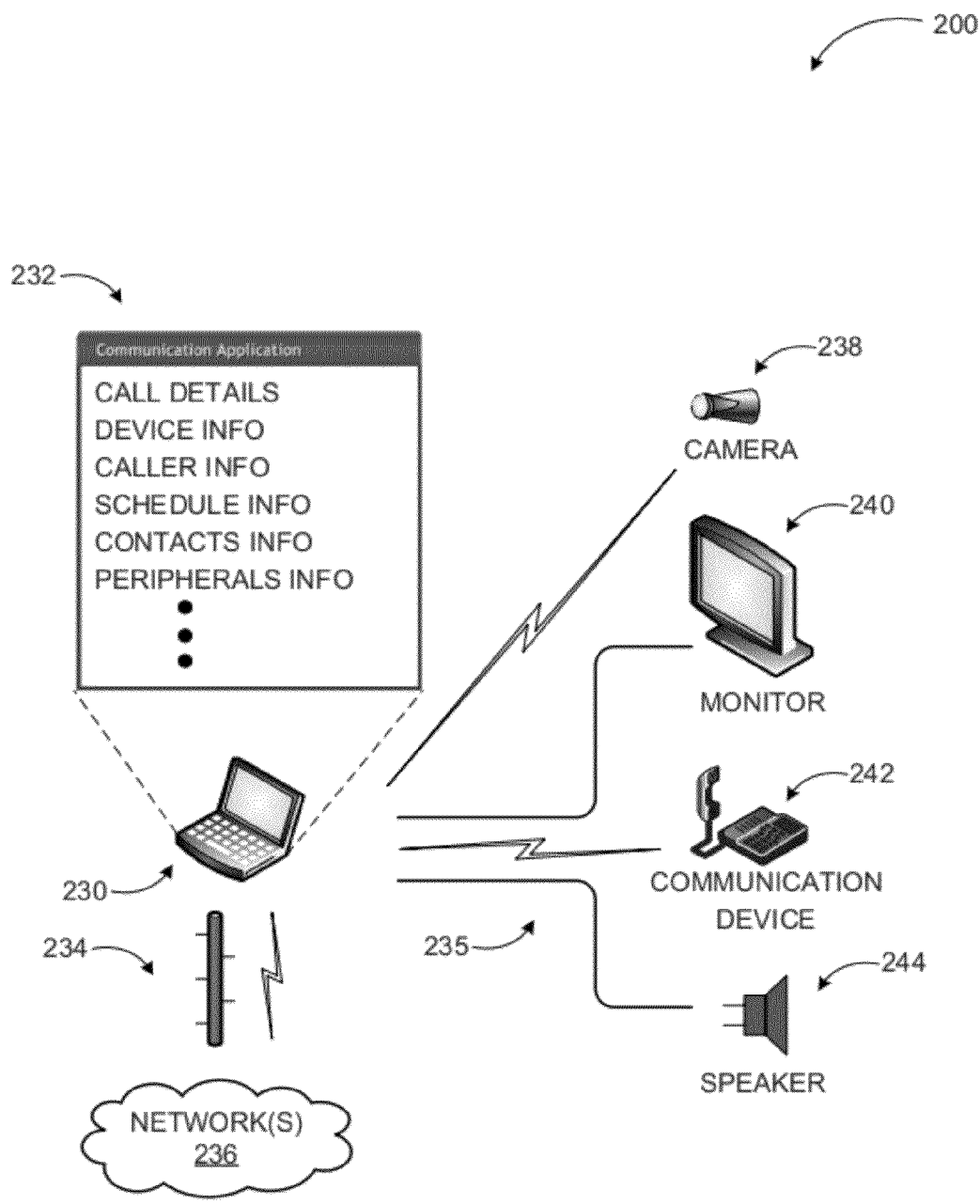
FIG. 2 illustrates an example communication application executed on a computer connected to a plurality of peripheral devices according to embodiments.

FIG. 2 illustrates an example communication application executed on a computer connected to a plurality of peripheral devices according to embodiments. While a communication application according to embodiments may be executed on any computing device such as a smart automobile console or any custom computer, desktop/laptop computers are likely to be a more common environment due to their extensive use in homes, offices, and comparable places. Embodiments are not limited to the example computing devices, however. Diagram 200 shows a laptop computer 230 that is connected through a wired (e.g. Ethernet) and/or wireless (e.g. WLAN) connection 234 to network(s) 236. As discussed below in conjunction with FIG. 6, networks 236 may be one or more networks facilitating various modes of communications between end devices such as laptop computer 230.

Laptop computer 230 may execute, among other programs, communication application 232. Communication application 232 is arranged to enable communication through a variety of modes with other devices. As mentioned, such modes may include voice communication, video communication, data sharing, application sharing, instant messaging, or any combination thereof. Communication application 232 may provide a very rich communication experience to users by combining a number of additional functionalities with the basic communications. For example, communication application 232 may have a user interface providing the user interactive ability to view and take advantage of call details, caller details, device information, network information, contacts information schedule information, and comparable resources. A caller may be enabled to simply select a number of contacts and initiate a video conference by clicking on a single button.

Communication application 232 may utilize laptop computer 230's integrated components such as a speaker, a microphone, and a monitor to facilitate the communications. On the other hand, laptop computer 230 may have a number of peripheral devices connected to it through wired or wireless means 235. Wired or wireless means 235 are typically short range connections since peripheral devices such as camera 238, monitor 240, communication device 242, and speaker 244 are likely to be near the laptop computer 230. This is not a limitation, however. Embodiments may be implemented in computer systems, where the peripherals are connected to a computing device through longer range means such as a centralized peripheral network (e.g. a server in a central location may control peripheral devices in various locations and provide access to users through terminals).

Human Interface Device (HID) protocol is utilized in modern computing systems for advanced communication between peripheral devices and host computing devices. In HID protocol, HID peripherals deliver self describing packages containing a variety of data types and formats. An HID driver on the host computing device parses the data and enables dynamic association of the data Input/Output (I/O) with application functionality.

In the HID protocol architecture, a peripheral device defines its data packets and presents an "HID descriptor" to the host computer. The HID descriptor is a hardcoded array of bytes that describe the data packets of the device. This information may contain the number of supported packets, the size of the packets, and the function/purpose of each byte and bit in the packet. For example, a keyboard with a calculator program button can tell the host that the pressed/released state of the button is stored as the second bit in the sixth byte in data packet number four.

In a report mode, the host, in an effort to fully communicate with the device, typically retrieves and analyzes the HID descriptor from the device, which "reports" it to the host. In a boot mode, a defined list of devices, or only a portion of the functionality from these devices, are pre-loaded and recognized by the host. For example, in boot mode only the core keys of a keyboard may be supported, while advanced functionality, such as the Calculator and Logoff keys, are not. With respect to a mouse, only the X-axis, Y-axis, wheel, and the first three buttons may be recognized, while additional features are not.

Thus, peripheral devices 238 through 244 may be automatically configured by communication application 232 through a protocol like HID. When a communication request arrives, communication application 232 may notify the user through anyone of the peripheral devices through user preference, default order, or simply by activating all peripherals relevant for the communication type (e.g. for a simple voice call, the external monitor 240 may not be needed). If alternative peripheral devices are presented to the user (e.g. through a sound alert, visual alert, etc.), one (or a set) that is selected by the user may be employed for facilitating the communication and the others turned off by the communication application 232.

Figure 3:
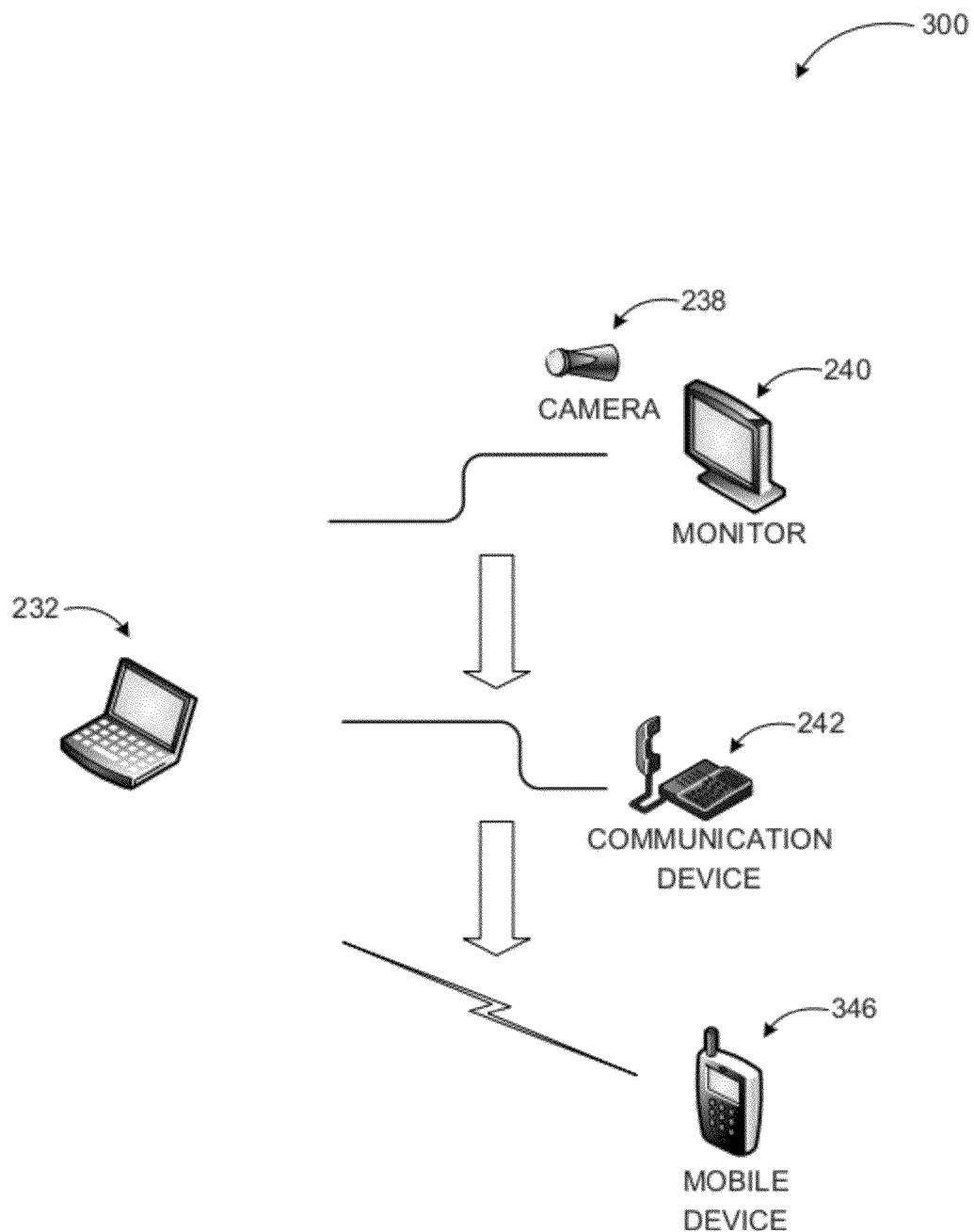
FIG. 3 is a conceptual diagram illustrating switching between different peripheral devices during a communication in a system according to embodiments.

FIG. 3 is a conceptual diagram illustrating switching between different peripheral devices during a communication in a system according to embodiments. Diagram 300 shows laptop computer 232 executing a communication application as discussed above. According to the example configuration in diagram 300, laptop 232 has three sets of peripheral devices available for facilitating communication: camera and external monitor combination (238, 240), communication device 242, and mobile communication device 346.

Each of the peripheral devices has differing capabilities regarding communication modes that can be facilitated, as well as other aspects. For example, video communication or application sharing may only be facilitated through the camera/monitor combination (238, 240). On the other hand, all three sets of devices can accommodate voice communication (assuming monitor 240 includes integrated microphone, speaker) but with different capabilities. Camera/monitor combination may provide better quality (higher bandwidth) while mobile communication device 346 provides freedom of movement while talking.

Thus, a user may not only select one of the available sets of peripheral devices at the beginning of a communication session, but also wish to switch during the communication session. By exchanging control commands through the established communication protocol, the communication application on laptop computer 232 may activate a different set of peripheral device(s) upon receiving user indication and deactivate the currently used one without interrupting the communication. For example, the user may initiate the call through the communication device 242. Later on, he/she may decide to switch to mobile communication device 346 and press the on button on that device. Upon receiving the indication from mobile communication device 346, the communication application may route the communication (audio) to the mobile communication device 346 and instruct communication device 242 to disconnect from the communication session. Of course, two or more peripheral devices may be activated and used for the same communication session upon user indication as well.

Figure 4:
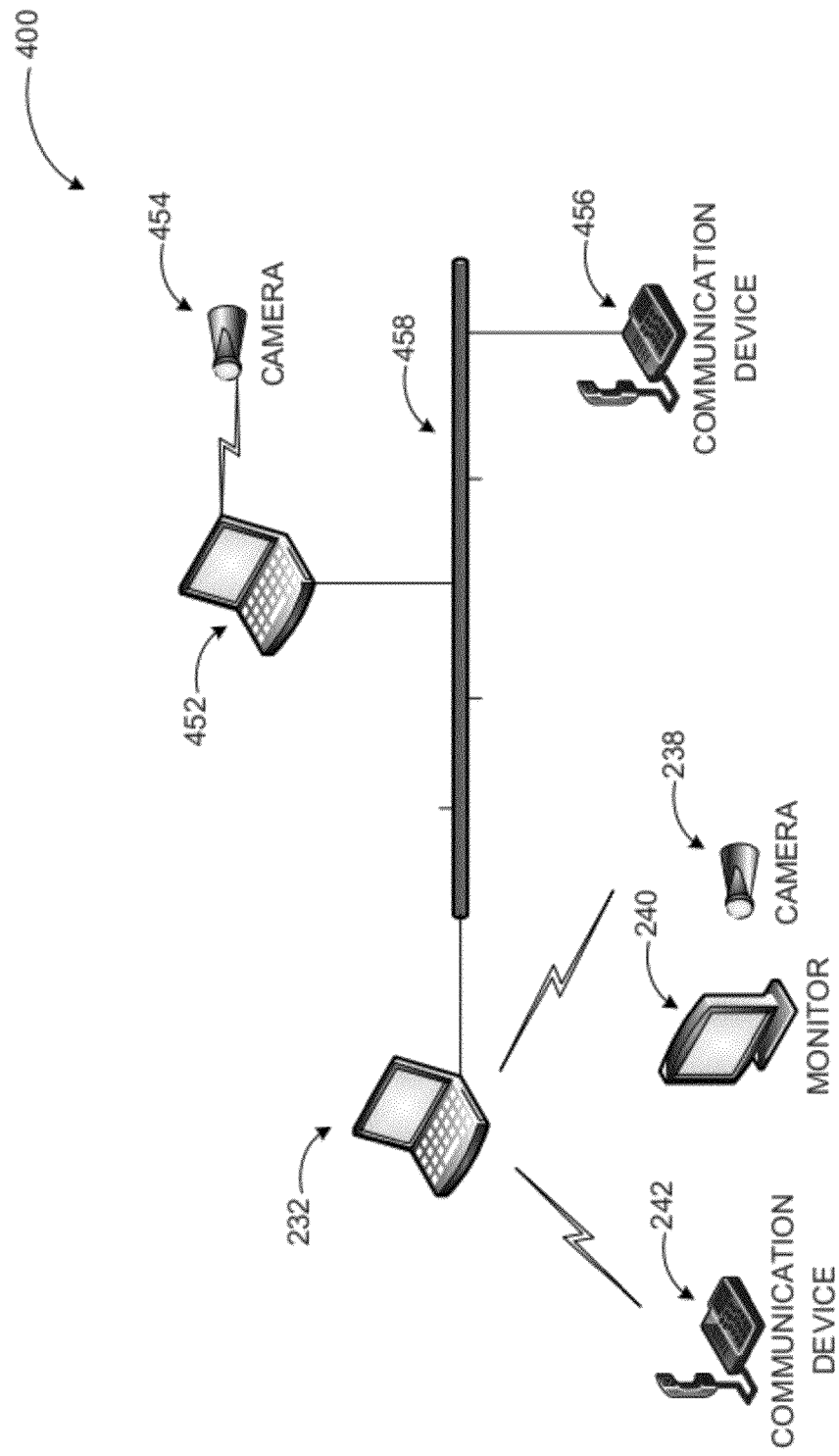
FIG. 4 is another conceptual diagram illustrating use of different peripheral devices for distinct modalities of a communication in a system according to embodiments.

FIG. 4 is another conceptual diagram illustrating use of different peripheral devices for distinct modalities of a communication in a system according to embodiments. Selection of appropriate peripheral devices and switching between peripheral devices during a communication session upon user indication has been discussed above. According to some embodiments, the selection and the switching may be handled dynamically and in some cases automatically by the communication application.

Diagram 400 shows an example system, where three devices: laptop computer 232, laptop computer 452, and communication device 456 are connected through network 458. Network 458 may be any type of network such as an enterprise network, or even the Internet. Each of these devices has different capabilities regarding support of various communication modalities. For example, communication device 456 can accommodate voice calls only, while a communication application on laptop computer 452 can facilitate voice and/or video communications through the use of peripheral camera 454. That communication application can probably also accommodate data centric communication modes such as data sharing, application sharing, and comparable ones.

Laptop computer 232 has a wider variety of peripherals (communication device 242, monitor 240, camera 238), and can therefore accommodate the broadest spectrum of communication modes. In an example scenario, two users may initiate a voice call/application sharing combination using laptop computers 232 and 452. Later in the call, they may decide to invite a third user, who can only join through communication device 456. Since that user is capable only to participate in the voice portion of the communication session, communication applications on the laptops may present the option of terminating the application sharing mode to the users or terminate that mode automatically depending on the configuration.

According to another scenario, the initial communication may be voice only between users through laptops 232, 452 and communication device 456. The user employing communication device 456 may drop out of the call sometime later, at which point video communication may become available to the remaining two users. Detecting that, the communication applications on both laptops may present that choice, and if confirmed activate the peripherals necessary for the continuation of the communication session as video call without interruption.

The computing devices and peripheral devices discussed above are for illustration purposes only and do not constitute a limitation on embodiments. Any type of computing device and peripheral device, as well as communication means and protocol may be used in implementing embodiments without departing from a scope and spirit of the present disclosure.

Figure 5:
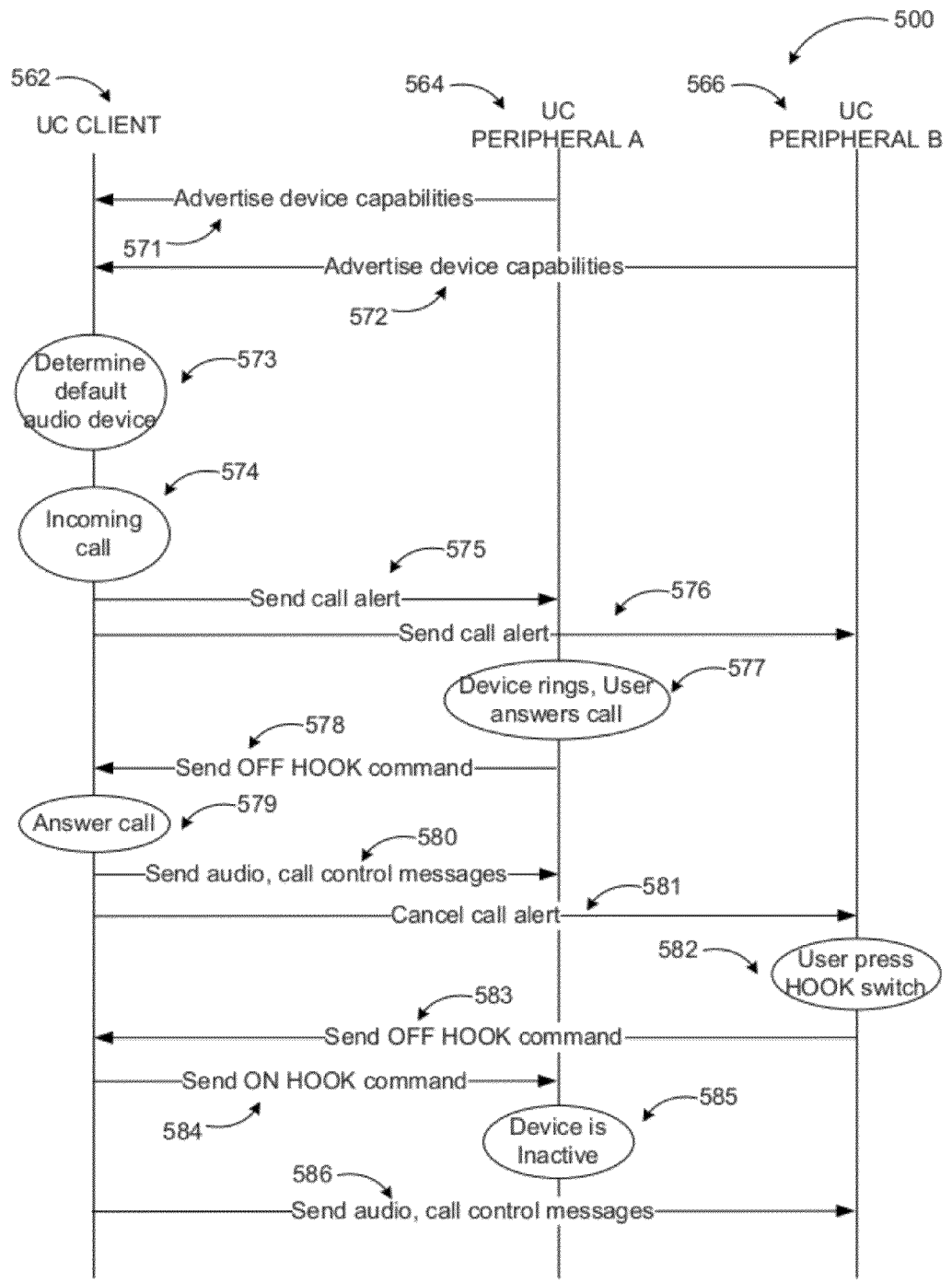
FIG. 5 is an action diagram illustrating interactions between a communication application and peripheral devices in an example voice communication.

FIG. 5 is an action diagram illustrating interactions between a communication application and peripheral devices in an example voice communication. As discussed before, embodiments may be implemented to facilitate any form of communication. The voice communication described in diagram 500 is an illustrative example only.

The actions in an example voice call scenario begin with peripheral devices 564 and 566 advertising their individual capabilities (571, 572) to client application 562 through an established protocol. Upon receiving information about available peripheral devices, the client application 562 determines a default device for audio calls (573) based on predefined rules, user preferences, or other parameters such as available power (in case of a mobile client), network conditions (bandwidth considerations), and comparable ones.

Next, an incoming call is detected (574) by the client application 562, which sends call alerts (575, 576) to both peripheral devices 564 and 566 (in the example scenario both may be selected as default devices). Upon ringing of device 564, the user may answer the call through that particular peripheral device (577) prompting the peripheral device 564 to send an OFF HOOK command (578) to the client application 562. In response, the client application answers the call (579) and sends audio and call control messages (580) to peripheral device 564. Client application 562 also sends a cancel call alert (581) to peripheral device 566 notifying that device that it will not be used for the call.

Sometime during the call, the user may decide to switch peripheral devices and press the HOOK switch (582) on the peripheral device 566 prompting that device to send an OFF HOOK command (583) to the client application 562. In response, client application 562 sends an ON HOOK command (584) to peripheral device 564 causing that device to become inactive (585) and sends the audio and call control messages (586) to peripheral device 566 enabling the user to continue the call through the peripheral device 566. The user may also indicate his/her wish to switch peripheral devices through a user interface associated with the client application 562.

According to some embodiments, a peripheral device does not have to be installed at the time a communication session is started on another peripheral device associated with the same communication application. The user may, on answering the call, determine that they want to use another peripheral device, which is not yet configured. The user may connect the second peripheral device to the computing device executing client application 562 while the call is already in progress using the first peripheral, causing the client application to recognize the second peripheral device and enable the user to transfer the call to the new peripheral device.

Other communication protocols, methods, and commands may, of course, be employed to dynamically handle communications through multiple peripheral devices. Furthermore, a variety of communication modes such as voice communication, video communication, instant messaging, electronic mail, data sharing, application sharing, white-boarding, and similar modes, may be available depending on the capabilities of each device and applications available on each device.

While specific computing devices and communication related tasks have been described above, these are for illustration purposes only and do not constitute a limitation on embodiments. Many other hardware environments and communication related tasks may be implemented using the principles described herein.

Figure 6:
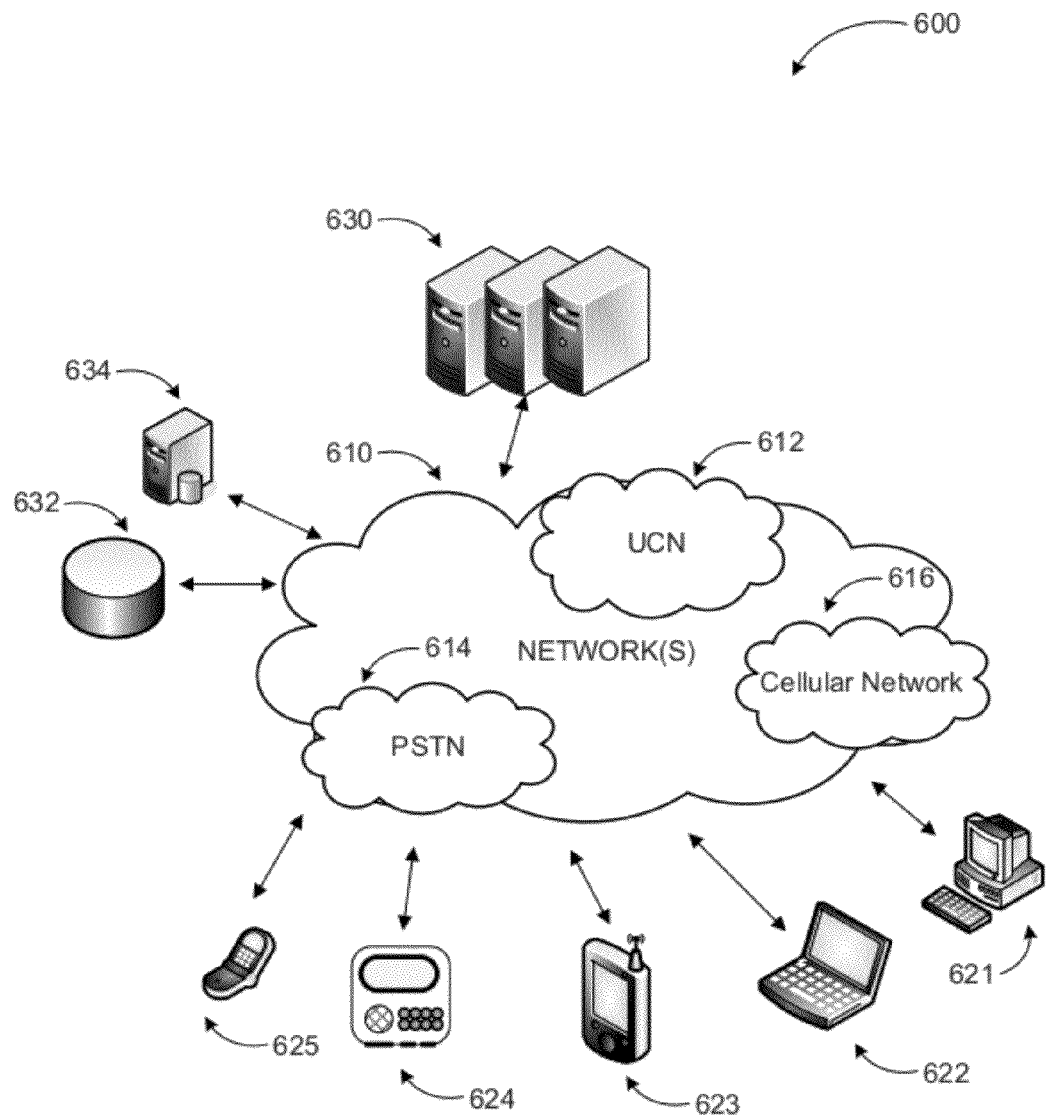
FIG. 6 is a networked environment, where a system according to embodiments may be implemented.

FIG. 6 is an example networked environment, where embodiments may be implemented. A platform providing unified communication services may be implemented via software executed over one or more servers 630 such as a hosted service. The platform may communicate with consuming applications on individual computing devices such as a cellular phone 625, smart automobile console 624, a handheld computer 623, a laptop computer 622, and desktop computer 621 through network(s) 610.

As discussed previously, computing devices 621-625 are used to facilitate communications through a variety of modes between subscribers of the UC service. Some of those computing devices such as desktop computer 621, laptop computer 622, or even smart automobile console 624 may be coupled to a number of peripheral devices communicating with those through a standard protocol. The peripheral devices may be automatically configured and dynamically selected prior to or during a communication session based on desired communication modalities, user preferences, and similar parameters. Information associated with subscribers and facilitating communications may be stored in one or more data stores (e.g. data store 632), which may be managed by any one of the servers 630 or by database server 634.

Network(s) 610 may comprise any topology of servers, clients, Internet service providers, and communication media. A system according to embodiments may have a static or dynamic topology. Network(s) 610 may include a secure network such as an enterprise network, an unsecure network such as a wireless open network, or the Internet. Network(s) 610 may also comprise a plurality of distinct networks such as UC network 612, PSTN 614, and cellular network 616. Network(s) 610 provides communication between the nodes described herein. By way of example, and not limitation, network(s) 610 may include wireless media such as acoustic, RF, infrared and other wireless media.

Many other configurations of computing devices, applications, data sources, and data distribution systems may be employed to implement a system for dynamically handling calls through multiple peripheral devices. Furthermore, the networked environments discussed in FIG. 6 are for illustration purposes only. Embodiments are not limited to the example applications, modules, or processes.

Figure 7:
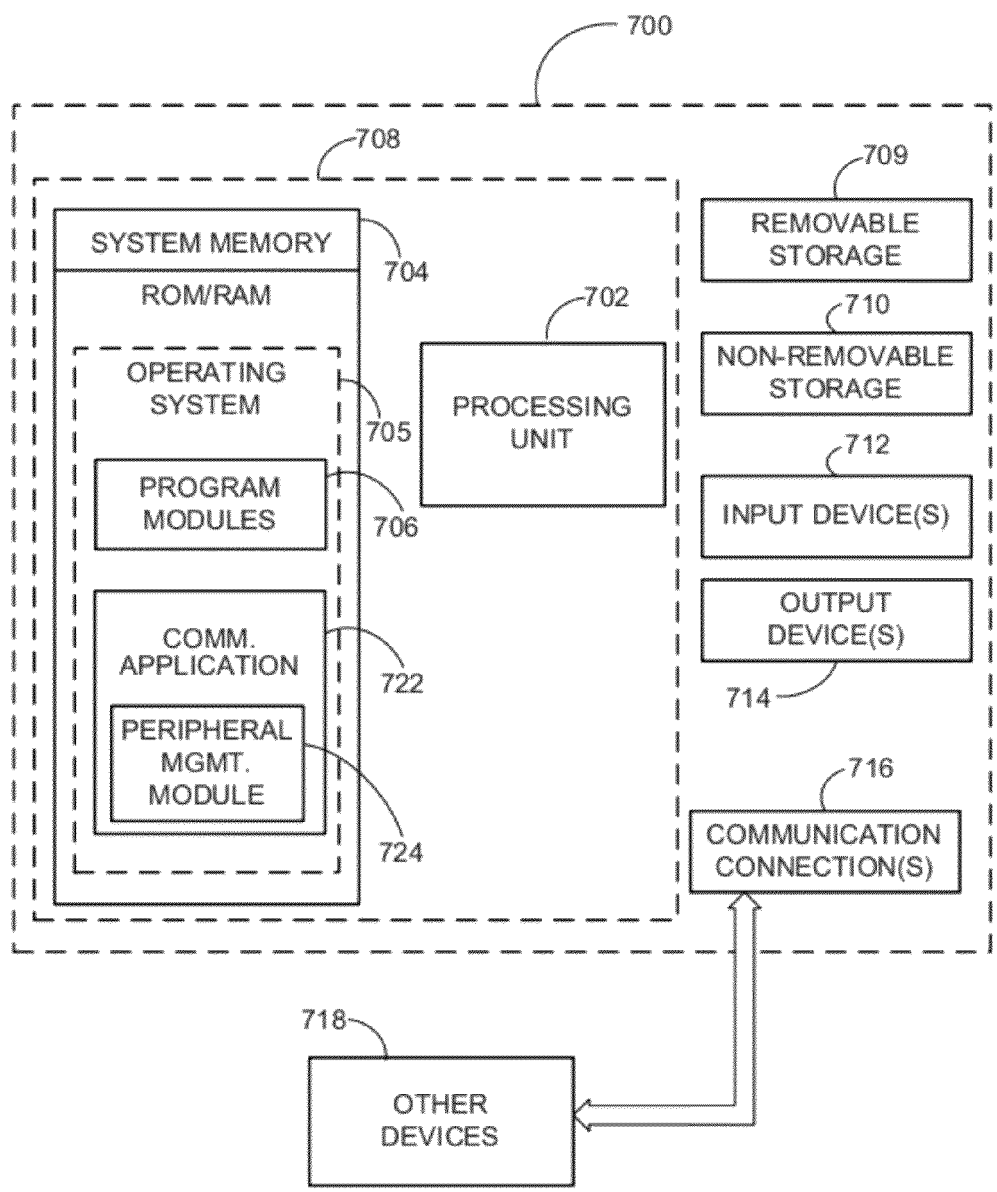
FIG. 7 is a block diagram of an example computing operating environment, where a communication application according to embodiments may be implemented.

FIG. 7 and the associated discussion are intended to provide a brief, general description of a suitable computing environment in which embodiments may be implemented. With reference to FIG. 7, a block diagram of an example computing operating environment for an application according to embodiments is illustrated, such as computer 700. In a basic configuration, computer 700 may include at least one processing unit 702 and system memory 704. Computer 700 may also include a plurality of processing units that cooperate in executing programs. Depending on the exact configuration and type of computing device, the system memory 704 may be volatile (such as RAM), non-volatile (such as ROM, flash memory, etc.) or some combination of the two. System memory 704 typically includes an operating system 705 suitable for controlling the operation of the platform, such as the WINDOWS® operating systems from MICROSOFT CORPORATION of Redmond, Wash. The system memory 704 may also include one or more software applications such as program modules 706, communication application 722, and peripheral management module 724.

Communication application 722 and peripheral management module 724 may be separate applications or integral modules of a hosted service that provides communication services to client applications/devices. Peripheral management module 724 may communicate with any attached peripheral devices exchanging control messages, routing communications, and enabling communication application 722 to facilitate various modalities of communication through appropriate and/or selected peripheral devices. This basic configuration is illustrated in FIG. 7 by those components within dashed line 708.

Computer 700 may have additional features or functionality. For example, the computer 700 may also include additional data storage devices (removable and/or non-removable) such as, for example, magnetic disks, optical disks, or tape. Such additional storage is illustrated in FIG. 7 by removable storage 709 and non-removable storage 710. Computer readable storage media may include volatile and nonvolatile, removable and non-removable media implemented in any method or technology for storage of information, such as computer readable instructions, data structures, program modules, or other data. System memory 704, removable storage 709 and non-removable storage 710 are all examples of computer readable storage media. Computer readable storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computer 700. Any such computer readable storage media may be part of computer 700. Computer 700 may also have input device(s) 712 such as keyboard, mouse, pen, voice input device, touch input device, and comparable input devices. Output device(s) 714 such as a display, speakers, printer, and other types of output devices may also be included. These devices are well known in the art and need not be discussed at length here. These output devices are distinct from the peripheral devices coupled to computing device 700 through wired or wireless media as discussed above.

Computer 700 may also contain communication connections 716 that allow the device to communicate with other devices 718, such as over a wireless network in a distributed computing environment, a satellite link, a cellular link, a short range connection, and comparable mechanisms. Other devices 718 may include computer device(s) that execute communication applications, as well as peripheral devices for facilitating different modes of communication. Communication connection(s) 716 is one example of communication media. Communication media can include therein computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

Example embodiments also include methods. These methods can be implemented in any number of ways, including the structures described in this document. One such way is by machine operations, of devices of the type described in this document.

Another optional way is for one or more of the individual operations of the methods to be performed in conjunction with one or more human operators performing some. These human operators need not be collocated with each other, but each can be only with a machine that performs a portion of the program.

Figure 8:
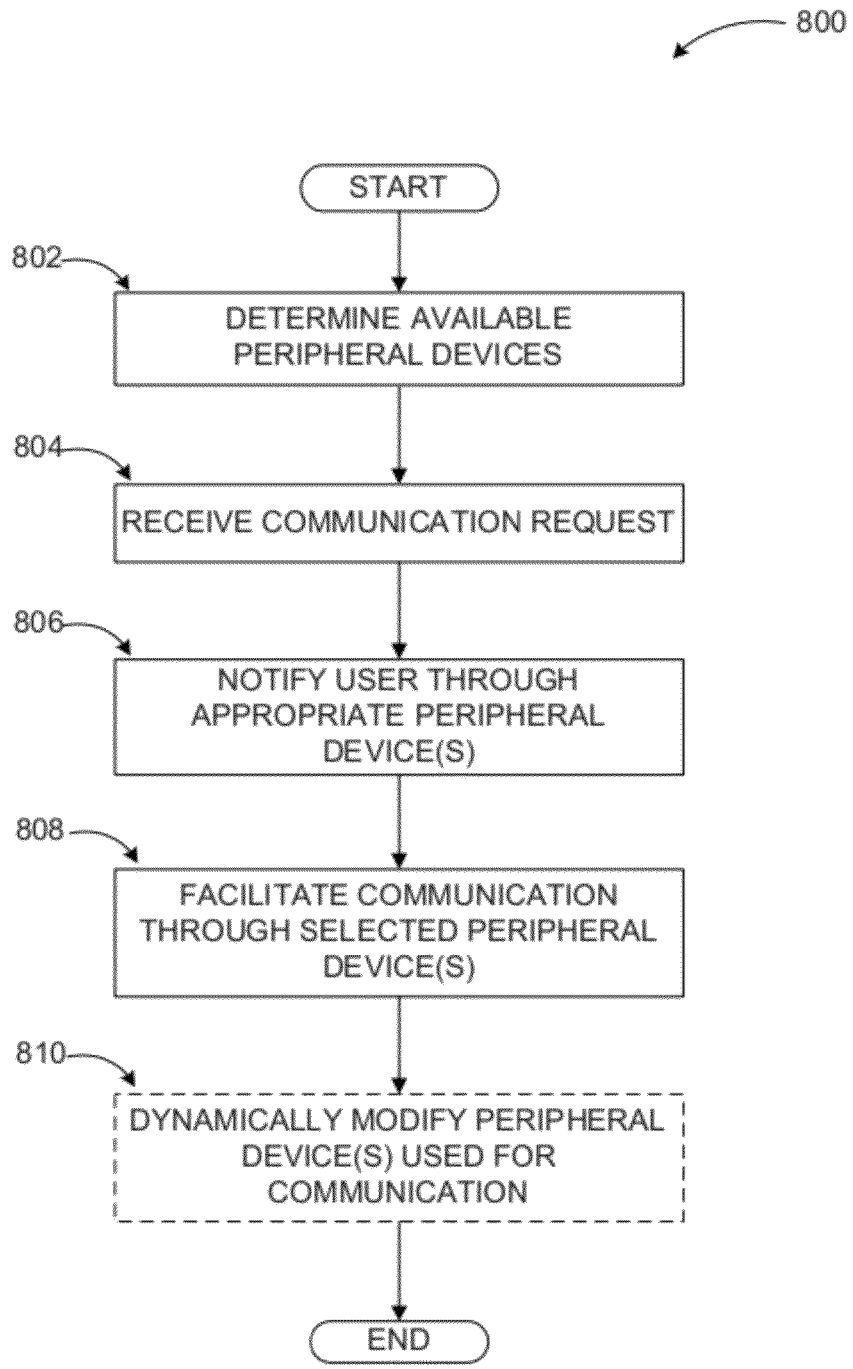
FIG. 8 illustrates a logic flow diagram for dynamically handling communications through peripheral devices in a UC system according to embodiments.

FIG. 8 illustrates a logic flow diagram 800 for using called party's mobile status in facilitating communications according to embodiments. Process 800 may be implemented as part of a unified communication system communication application such as the one described above in conjunction with FIGS. 3 and 4.

Process 800 begins with operation 802, where available peripheral devices are determined at a computing device executing a communication application. The available peripheral devices may be connected to the computing device through wired or wireless means (e.g. short range RF transmission, optical communication, USB connection, and similar ones) and communicate through a standard (e.g. HID) or custom communication protocol. The peripheral devices may advertise themselves and their capabilities to the computing device or the computing device may regularly check its communication ports for connected devices. Processing continues to operation 804 from operation 802.

At operation 804, a communication request is received from an end device associated with another user for establishing a communication session with a user associated with the computing device. The communication may include voice communication, video communication, electronic mail exchange, instant messaging, data sharing, application sharing, white-boarding, and similar ones. The end device requesting the communication session may be a custom device (e.g. a telephone) or another computing device executing another communication application. Some of the communication types may include more than one communication modalities. For example, video communication includes exchange of video images as well as voice. Furthermore, some communication sessions may include a combination of different modalities. Processing advances from operation 804 to operation 806.

At operation 806, the user is notified through appropriate peripheral devices about the pending communication request. The appropriate peripheral devices may include all available peripheral devices, user selected ones, default ones, or those determined to be appropriate for the pending communication type. For example, a computer may have a video phone device, a microphone, a speaker, a monitor, and a camera coupled to it. When a request for a video call arrives, the communication application may notify the user through the video phone device and through the monitor/speaker combination or a selected/default one of those two. Processing moves to operation 808 from operation 806.

At operation 808, the communication session is facilitated through the selected peripheral devices. The peripheral devices may be selected as discussed above. The control of those devices may be handled by the communication application through exchange of control commands using the peripheral device protocol. Processing may continue to optional operation 810 after operation 808.

At optional operation 810, the peripheral devices used in the communication session may be dynamically modified based on user selection or change of communication parameters. For example, the user may begin a voice call suing their computer's microphone and speaker, but later switch to the connected phone device. Similarly, a communication session may begin as a video communication, but later change to voice only (the video capability may be lost due to network conditions, the caller may decide it is no longer necessary, etc.), at which point the communication application may automatically turn of the video component and use audio peripheral device(s) only.

The operations included in process 800 are for illustration purposes. Dynamically handling communications through peripheral devices may be implemented by similar processes with fewer or additional steps, as well as in different order of operations using the principles described herein.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A method to be executed at least in part in a computing device for handling communications through a plurality of peripheral devices, the method comprising:
    determining available peripheral devices coupled to the computing device;
    configuring the available peripheral devices by each peripheral device advertising its capabilities to the computing device and transmitting control commands to the peripheral devices through a standard communication protocol based on at least one of: a predefined rule and a computing device parameter;
    receiving a communication request from a calling party;
    determining an appropriate peripheral device based on a type of the received communication request, power consumption parameter of the computing device, and available peripheral device capabilities;
    notifying a user through the appropriate peripheral device; and
    in response to receiving an indication of the user's acceptance of the communication request, facilitating the communication through the appropriate peripheral device, wherein the appropriate peripheral device is configured to accommodate a type of facilitated communication comprising at least one from a set of: voice communication, video communication, electronic mail exchange, instant messaging, data sharing, application sharing, and white-boarding; and
    in response to detecting a change condition, facilitating the communication through another one of the available peripheral devices.

2. The method of claim 1, wherein the change condition includes one of: an indication of a peripheral device switch from the user and a change of communication type.

3. The method of claim 2, wherein the indication of the peripheral device switch from the user is received through one of: a desired peripheral device and a user interface of a communication application executed on the computing device.

4. The method of claim 1, wherein the appropriate peripheral devices include one of: all available peripheral devices, user selected peripheral devices, and peripheral devices capable of accommodating the received communication request type.

5. The method of claim 1, wherein the peripheral device include one of: a speaker, a microphone, a monitor, a custom communication device, and a camera.

6. The method of claim 1, wherein the peripheral devices are coupled to the computing device through one of: a wireless means and a wired means, and wherein a communication application executed on the computing device is configured to communicate with the peripheral devices through one of: a standard communication protocol and a custom communication protocol.

7. The method of claim 6, wherein the wireless means includes one of: a short range Radio Frequency (RF) communication link and an optical communication link, and wherein the wired means includes one of: a parallel communication connection and a serial communication connection.

8. The method of claim 6, wherein the standard communication protocol includes Human Interface Device (HID) protocol for exchanging control commands and communication data.

9. A system for handling unified communications through peripheral devices, the system comprising:
    a first computing device having a plurality of coupled peripheral devices, the computing device executing a communication application configured to:
        determine available peripheral devices coupled to the first computing device;
        configure the coupled peripheral devices through a standard communication protocol by each peripheral device advertising its capabilities to the first computing device and the first computing device transmitting control commands to the peripheral devices through a standard communication protocol based on at least one of: a predefined rule and a computing device parameter;
        receive a communication request from a calling party employing a second computing device;
        determine at least one appropriate peripheral device based on a type of the received communication request, a power consumption parameter of the computing device, and coupled peripheral device capabilities;
        notify a user of the first computing device through the at least one appropriate peripheral device; and
        in response to receiving an indication of the user's acceptance of the communication request through a selected peripheral device, facilitate the communication between the first and the second computing devices through the selected peripheral device, wherein the selected applicable peripheral device is configured to accommodate a type of facilitated communication comprising at least one from a set of: voice communication, video communication, electronic mail exchange, instant messaging, data sharing, application sharing, and white-boarding;

in response to detecting a change of communication type, facilitate the communication through another one of the coupled peripheral devices; and a server configured to facilitate exchange of communication between the first and second computing devices through a unified communications network.

10. The system of claim 9, wherein the coupled peripheral devices are configured through the first computing device querying its local communication ports periodically.

11. The system of claim 9, wherein the second computing device includes one of: a computer and a custom communications device.

12. The system of claim 9, wherein the first and second computing devices facilitate communications over at least one from a set of: a wireless short range network, a wireless long range network, a cellular network, a Public Switched Telephone Network (PSTN), a satellite assisted network, and a wired data network.

13. The system of claim 9, wherein the user is notified through at least one of: an audio alert and a visual alert through at least one from of: a user interface of the communication application and the selected peripheral device.

14. The system of claim 9, wherein the peripheral device for facilitating the communication is selected through a user interface of the communication application based on at least one from a set of: a mode of the communication, a unified communications network parameter, a power consumption parameter of the first computing device, and a request by the calling party.

15. A computer-readable storage medium having instructions stored thereon for dynamically facilitating communications through multiple peripheral devices, the actions comprising:

determining available peripheral devices coupled to a computing device;

configuring the available peripheral devices by each peripheral device advertising its capabilities to the first computing device and transmitting control commands to the peripheral devices through a standard communication protocol based on at least one of: a predefined rule and a computing device parameter;

receiving a communication request from a calling party;

determining an applicable peripheral device based on a type of the received communication request and a power consumption parameter of the computing device;

notifying a user through the applicable peripheral device;

in response to receiving an indication of the user's acceptance of the communication request, facilitating the communication through the applicable peripheral device, wherein the set of applicable peripheral device is configured to accommodate a type of facilitated communication comprising at least one from a set of: voice communication, video communication, electronic mail exchange, instant messaging, data sharing, application sharing, and white-boarding; and in response to detecting a change of communication type, facilitating the communication through another one of the available peripheral devices.

16. The computer-readable storage medium of claim 15, wherein the instructions further comprise:

enabling the user to switch to another set of applicable peripheral devices during the communication without interrupting the communication.

17. The computer-readable storage medium of claim 16, wherein the set of applicable peripheral devices is configured to communicate with the computing device employing HID.

* * * * *